July 16, 1935.　　　H. BAUMEISTER　　　2,008,538
CONTROL OF ALTERNATING CURRENT MOTORS
Filed April 13, 1933
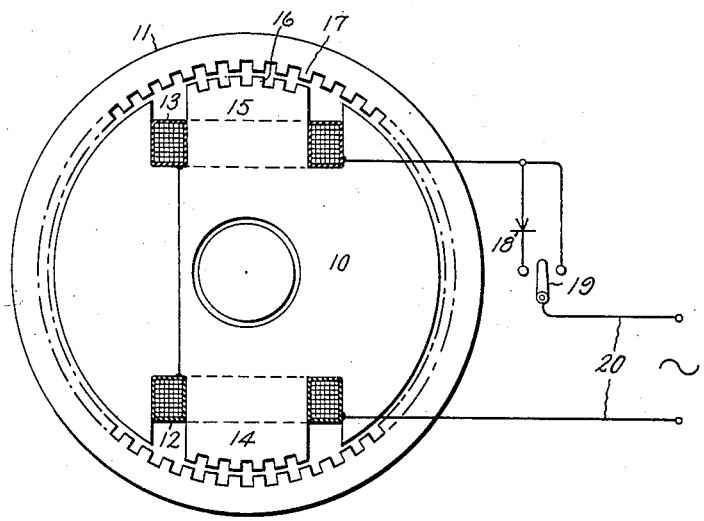
Inventor:
Heinrich Baumeister,
by Chas. W. Muller
His Attorney.

Patented July 16, 1935

2,008,538

UNITED STATES PATENT OFFICE 2,008,538

CONTROL OF ALTERNATING CURRENT MOTORS

Heinrich Baumeister, Berlin-Pankow, Germany, assignor to General Electric Company, a corporation of New York Application April 13, 1933, Serial No. 665,942
In Germany July 21, 1932

7 Claims. (Cl. 172—274)

My invention relates to the control of alternating current motors, and while of general application it is particularly applicable to synchronous phonograph motors and other small motors.

It has been proposed to drive phonographs with low speed alternating current synchronous motors mounted directly upon the turn table shaft. Motors thus designed for this low speed have heretofore been quite large, but by means of the present invention the size of such motors may be reduced by approximately one-half.

It sometimes is desirable to operate a phonograph at two different speeds, the lower speed being one-half of the higher speed, to play records made to operate at the two different speeds. By means of my invention I may use the same synchronous motor for such two-speed application without resorting to gear changing devices or their equivalent, thereby greatly simplifying the apparatus, reducing gear noises, and lowering costs.

These results are accomplished by means of my invention, in that I have discovered that certain alternating current motors may be successfully operated on uni-directional current pulsations and that I may make use of a one-way valve or the equivalent in the circuit of such a motor to obtain the effect of reducing the frequency by one-half. For two-speed operation I may connect the motor directly to the alternating current source to obtain high speed operation, and through a one-way valve for half speed operation.

In small alternating current motors where the power requirements are low, this simple expedient is entirely feasible and practicable, and is particularly suitable for two-speed operation where, as is usually the case, the low speed power requirements are proportionally lower than for high speed.

A simple embodiment of my invention is represented in the drawing, where the invention is applied to a two-speed synchronous reluctance motor drive.

Referring to the drawing, I have represented a simple form of single phase non-self-starting synchronous reluctance motor having an inner stator 10 and an outer rotor 11. The stator is provided with two windings 12 and 13 connected to produce fluxes in the pole pieces 14 and 15 which they surround. It will be assumed that the windings are connected to make one pole south when the other is north, producing flux pulsations between stator and rotor. The active stator periphery at the tip of poles 14 and 15 is provided with teeth 16, and the inner periphery of the rotor is provided with teeth 17 over its entire surface, but all are not shown in the drawing. The teeth in stator and rotor are similarly spaced, whereby it will be evident that if the rotor is brought to a speed such that the teeth come opposite each other in approximate synchronism with the flux pulsations, the rotor will fall into step and run synchronously. This is one modification of a well known form of synchronous motor, and it may be provided with facilities to assist synchronization without departing from the present invention.

The synchronous speed of the motor will depend upon the number of rotor teeth and the frequency of the pulse fluxations, the latter being 120 per second if the motor is excited from the ordinary 60-cycle commercial source in the usual way. Thus, if the rotor has 90 teeth and the winding is supplied with an ordinary alternating current of 60-cycle frequency, the rotor will move one tooth's distance in a half cycle, two teeth distance per cycle, and run at 80 R. P. M., which is, approximately, the desired speed for direct drive of the ordinary phonograph.

In order to build a practicable motor with 90 stator teeth, it will be evident that the rotor tooth periphery and the motor as a whole will have to be quite large. However, if I connect a one-way valve such as is represented at 18 in the motor circuit and suppress the flow of current in one direction, only the unidirectional current pulsations in the opposite direction, or half waves of one sign, will flow. The number of flux pulsations between stator and rotor will now be 60 per second, instead of 120 per second, and the synchronous speed for the same motor will be cut in half; or if we wish only the same speed as before we can make the motor with only 45 rotor teeth, which will permit a very material reduction in motor size.

In the drawing, the motor circuit is provided with a switch 19 by means of which the motor may be energized alternately from the alternating current line represented at 20, either directly or through the one-way valve 18. When the switch is thrown to the right the motor will have the normal synchronous speed for this type of motor, and when the switch is thrown to the left the synchronous speed of the motor will be cut in half.

For phonograph motors and small synchronous clock motors, a copper oxide rectifier may be used as the one-way valve. There will be some energy loss in the valve, but ordinarily the power requirement for the motor at the low speed will be less than half the requirement for high speed, so the valve, in addition to providing an exceedingly simple speed control expedient, will ordinarily be beneficial in reducing unnecessary motor excitation at the low speed.

In addition to the above mentioned application of the invention for reducing the size of motors and obtaining a simple two-speed control, the invention is also useful in reducing the speed of synchronous timing motors so that less gear reduction is needed.

The invention may be applied to any alternating current motor capable of operating on the half cycle pulsations. In some cases it may be desirable to connect a condenser across the motor windings during operation on the half cycle wave to lengthen the duration of the flux pulsations.

What I claim as new and desire to secure by Letters Patent of the United States, is:

1. A single-phase alternating current motor of the synchronous reluctance type, and means for supplying said motor with only the half waves of one sign from a commercial alternating current source.

2. A synchronous alternating current motor of a type capable of operating synchronously on unidirectional current pulsations, and means for supplying said motor from a single-phase commercial alternating current source with only the half wave current pulsations flowing in one direction.

3. An alternating current motor of a type capable of operating synchronously on unidirectional current pulsations, and means for selectively supplying said motor from a single-phase commercial alternating current source with only the half wave current pulsations of one sign and with the full wave current pulsations of both signs.

4. The method of operating an alternating current synchronous motor at half normal speed, which consists in operating as a reluctance motor, supplying such motor from a single-phase commercial source of alternating current and suppressing the half wave current pulsations of one sign.

5. The method of controlling the synchronous speed of an alternating current synchronous reluctance motor, which consists in supplying such motor from a single-phase commercial source of alternating current with the full wave current of such source for one speed and with only the half wave current pulsations of one sign for a lower speed.

6. A single phase alternating current synchronous reluctance motor, a source of commercial alternating current, and a one-way valve connected in series relation between said motor and source.

7. A single phase alternating current synchronous motor, a source of commercial alternating current, a one-way valve, and means for selectively connecting said motor to said source directly or through said valve.

HEINRICH BAUMEISTER.